United States Patent
Wang

(10) Patent No.: US 8,442,195 B2
(45) Date of Patent: May 14, 2013

(54) METHOD FOR CONTROLLING PROCESS OF ESTABLISHING CALL

(75) Inventor: Zhengwei Wang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1252 days.

(21) Appl. No.: 11/596,235

(22) PCT Filed: May 26, 2005

(86) PCT No.: PCT/CN2005/000735
§ 371 (c)(1),
(2), (4) Date: Sep. 18, 2007

(87) PCT Pub. No.: WO2005/122600
PCT Pub. Date: Dec. 22, 2005

(65) Prior Publication Data
US 2008/0159500 A1    Jul. 3, 2008

(30) Foreign Application Priority Data
May 27, 2004    (CN) .......................... 2004 1 0042905

(51) Int. Cl.
*H04M 3/42*    (2006.01)
(52) U.S. Cl.
USPC ............................... 379/201.02; 379/211.01
(58) Field of Classification Search .................. 379/211, 379/211.01, 201.02, 210.01–210.03, 207.1–207.15; 455/414.1, 415, 417, 418
See application file for complete search history.

(56) References Cited

U.S. PATENT DOCUMENTS

| | | | | |
|---|---|---|---|---|
| 5,905,794 A | * | 5/1999 | Gunn et al. | 379/382 |
| 6,005,870 A | | 12/1999 | Leung et al. | |
| 6,049,712 A | * | 4/2000 | Wallinder | 455/410 |
| 7,027,569 B2 | * | 4/2006 | Price | 379/88.16 |

(Continued)

FOREIGN PATENT DOCUMENTS

| | | |
|---|---|---|
| CN | 2195167 Y | 4/1995 |
| CN | 1 239 853 A | 12/1999 |

(Continued)

OTHER PUBLICATIONS

Written Opinion of the International Searching Authority, International Application No. PCT/CN2005/000735, Applicant: Huawei Technologies Co., Ltd., Date of mailing: Aug. 11, 2005, 6 pages.

(Continued)

*Primary Examiner* — Amal Zenati
(74) *Attorney, Agent, or Firm* — Slater & Matsil, L.L.P.

(57) ABSTRACT

The present invention discloses a method for controlling a process of establishing a call, comprising: setting group codes in a called terminal; sending a calling number and a corresponding group code to the called terminal; the called terminal determining whether the received group code is one of the group codes set in the called terminal, if the received group code is one of the group codes set in the called terminal, allowing a call to be established between the calling terminal corresponding to the calling number and the called terminal, otherwise, refusing the call. According to one aspect of the invention, the called user enables a function of group code call when he does not want to be disturbed by frequent calls. So the called user will not be disturbed by unimportant calls or harassing calls while simultaneously the called user will not miss any important call.

31 Claims, 5 Drawing Sheets

U.S. PATENT DOCUMENTS

| | | | |
|---|---|---|---|
| 7,046,782 B2 * | 5/2006 | Miller | 379/207.14 |
| 2005/0261034 A1 * | 11/2005 | Punaganti et al. | 455/567 |
| 2008/0056474 A1 | 3/2008 | Wang et al. | |
| 2008/0159500 A1 | 7/2008 | Wang | |

FOREIGN PATENT DOCUMENTS

| | | |
|---|---|---|
| CN | 1 316 848 A | 10/2001 |
| CN | 1404327 A | 3/2003 |
| CN | 1404327 A | 3/2003 |
| CN | 1492694 A | 4/2004 |
| CN | 1492694 A | 4/2004 |
| CN | 1677993 A | 10/2005 |
| CN | 1859501 A | 11/2006 |
| CN | 100355261 C | 12/2007 |
| EP | 1 081 971 A1 | 3/2001 |
| GB | 2 203 614 A | 10/1988 |
| GB | 2 394 141 A | 4/2004 |
| JP | 11-017839 (A) | 1/1999 |
| JP | 2000 286959 A | 10/2000 |
| JP | 2002-232522 (A) | 8/2002 |
| JP | 2002-247236 (A) | 8/2002 |
| JP | 2002-290540 (A) | 10/2002 |
| JP | 2002-374347 (A) | 12/2002 |
| JP | 2003-264630 (A) | 9/2003 |
| WO | WO 00/22763 A1 | 4/2000 |
| WO | WO 00/22863 A1 | 4/2000 |
| WO | WO 00/78086 A1 | 12/2000 |
| WO | WO 03/039173 A1 | 5/2003 |
| WO | WO 03/069877 A2 | 8/2003 |

OTHER PUBLICATIONS

Chinese Office Action, Chinese Application No. 200410042905.1, Dated: Mar. 16, 2007, 6 pages.
Japanese Decision of Rejection, Japanese Application No. 2007-516945, Applicant: Huawei Technologies Co., Ltd., Dated: Jun. 8, 2009, 7 pages.
European Office Action, European Application No. 05 752 368.0-2412, Applicant: Huawei Technologies Co., Ltd., Dated: Oct. 28, 2010, 7 pages.
Partial Translation of First Chinese Offcie Action of Chinese Application No. 200710153086.1, date mailed Sep. 11, 2009, 6 pages.
Translation of Second Chinese Office Action of Chinese Application No. 200710153086.1, dated mailed Aug. 9, 2011, 5 pages.
European Communication Pusuant to Article 96(2) EPC, Application No. 05 752 368.0-2412, Huawei Technologies Co., Ltd., Sep. 13, 2007, 5 pages.

* cited by examiner

METHOD FOR CONTROLLING PROCESS OF ESTABLISHING CALL

FIELD OF THE INVENTION

The present invention relates to the field of call control technology, and particularly, to a method for controlling the process of establishing a call.

BACKGROUND OF THE INVENTION

Along with the popularization of terminal equipment such as fixed telephones and mobile phones, the terminal equipment have greatly facilitated people's work and living in the way that people may communicate with others through terminal equipment at any time. However, terminal equipment also bring some troubles to their users. For example, a user does not want to be disturbed by unimportant phone calls at night or during leisure time, but he also does not want to miss important calls. However, in fact there are unimportant calls coming in during such periods, some of which are even harassing calls.

The user may turn off the terminal equipment to avoid being disturbed by unwanted calls and turn on the terminals again when he needs them. Terminal equipment comprises fixed terminals and mobile terminals, and it is comparatively easy to turn off the mobile terminals. However, the only way to turn off a fixed phone is to disconnect the telephone line, which is very inconvenient for the user. Moreover, turning off terminals, mobile or fixed, will bring other problems: the user will not get any phone calls when the terminal equipment is turned off, and others will not be able to contact the user even with very important business matters. And the user needs to turn on the terminals again when he needs them. It is convenient to turn off or turn on the mobile terminals, but the user commonly forgets to turn on fixed terminals. Thus the user will not get the phone calls from anyone through the terminal if it is not turned back on.

The user may also utilize the secretary service currently offered by the mobile communication system, but the service is applied to the mobile terminals only. The user of the mobile terminals may customize the settings of his secretary station; for instance, the user who does not want to be disturbed by the phone calls may require the secretary station to record voice messages for the calling users and send the messages to the user. Therefore when the secretary receives the phone call for the user, it will ask the calling user to leave the message and then inform the called user by short messages or other means. The called user calls the secretary station to get the voice message left for him by the calling user. The called user may decide whether to call back according to the content of the voice message, and thus will not be disturbed by incoming calls.

However, the secretary service is a paid service, i.e. the users of the service need to pay for it. The secretary station only converts incoming calls into short messages or other forms of notices to the called user, so the called user still receives short messages or other messages instead of calls and will still be disturbed. So this solution is not a perfect one. Besides, the short messages from the secretary station to the called user may be delayed or even lost, and the called user may not read the short messages in time. For example, the short messages are not real-time communication and the users usually set gentle, weak or even mute short message notification sounds, so it is usual for a user to fail to handle the short messages in time and accordingly fail to handle the urgent business in time.

Another solution is to set an incoming call filter. For instance, blacklists and whitelists can be used to protect users from the disturbance of unimportant phone calls while guaranteeing that important calls will never be missed. For instance, the whitelist solution comprises: setting a whitelist of calling numbers that are allowed to access the called terminal; when the called terminal enables the whitelist function, only the calling numbers in the whitelist may access the called terminal. The whitelist solution may solve the above-mentioned problem to a large extent, but the authorized calling numbers are limited in the solution. When a user A needs to call a user C in an emergency, supposing that the cell phone number of the user A is in the whitelist, but the user A calls with a user B's cell phone, the number of which is not in the whitelist, when his own one is out of power, the user A is unable to call through a number in the whitelist so that the user A will not be able to contact user C. The blacklist solution comprises: setting a blacklist of calling numbers that are not allowed to access the called terminal, when the called terminal enables the blacklist function, the incoming calls from the numbers in the blacklist will be refused. The blacklist solution is unable to refuse incoming calls from the number outside the blacklist. For example, harassing calls from public telephones are not refused in the blacklist solution. What's more, the maintenance of the blacklist and the whitelist is complicated.

SUMMARY OF THE INVENTION

A method for controlling the process of establishing a call, includes:

setting group codes in a called terminal;

transferring a calling number and a corresponding group code to the called terminal;

the called terminal determining whether the received group code is one of the group codes set in the called terminal; if the received group code is one of the group codes set in the called terminal, allowing a call to be established between a calling terminal corresponding to the calling number and the called terminal, otherwise, refusing the call.

The embodiments of the invention provide a solution with a group code function. The called users may enable the group code call function when they do not want to be disturbed by frequent incoming calls, requiring every incoming call in the scenario to transfer the corresponding group code to the called terminal. If a calling user does not obtain the correct group code from the called user, his calls shall not be connected to the called user and therefore it is guaranteed that the called user will not be disturbed by the unimportant calls or the harassing calls when the called user does not want to. However, the called user's family and friends can obtain the correct group code from the called user and thus are able to get through to the called user with the telephone; therefore it is also guaranteed that the called user will not miss any important call.

According to the solution provided by the embodiments of the invention, the called user may classify the calling users and assign the different group codes to the calling user groups with different priority levels, so the range of the incoming calls can be controlled flexibly. Besides, by setting the group codes, the user may change the calling user groups without changing his own telephone number. So if a user receives the harassing calls frequently, he may refuse such calls through group code settings. What's more, even the calling users of the harassing calls obtain the group codes of the called user, the called user may be still able to refuse their calls through changing group codes without changing the actual telephone number. That means the user may change the group codes instead of changing the telephone number in order to effectively refuse the harassing calls and guarantee the normal work and life of the user.

The solution provided in the embodiments of the invention may also solve the problem of the automatic maintenance of the whitelist. For example, the whitelist in the called terminal saves a user's telephone number such as 13923812345. One day the user's cell phone is out of power and the user needs to call the terminal with a fixed telephone. As the number of the fixed telephone is not in the whitelist of the called terminal, the direct call from the fixed telephone cannot be connected to the called terminal. But if the user sends his group code, which is set by the called terminal, to the called terminal through the fixed telephone with short messages or UUS signaling, the called terminal verifies the group code and registers the number of the fixed telephone in the pre-call calling number registry, then the user shall be connected from the fixed telephone to the called terminal. If the fixed telephone does not support the short massage service or the UUS service, the user may send the number of the fixed telephone and the corresponding group code to the called terminal through other people's cell phone.

To sum up, the method provided by the embodiments of the invention for establishing calls may guarantee with convenience that the called user will not be disturbed in certain circumstances while missing none of the important calls.

Besides, the solution of the group codes call provided in the embodiments of the invention may increase the service revenue of the operators without changing the network and therefore is easy to be accepted by the operators.

DETAILED DESCRIPTION OF THE INVENTION

In accordance with the solution provided by the embodiments of the invention, the called user first sets specific group codes in the called terminal. When the calling terminal A needs to be connected to the called terminal B, the calling terminal A sends the calling number and the corresponding group code to the called terminal B; the called terminal B decides whether to connect A based on the received information. After the called terminal B decides to allow an incoming call from the calling terminal A, B directly initiates a callback to A and a call between A and B shall be established through the callback. When the called terminal B decides to allow an incoming call from the calling terminal A, B may also merely register the calling number received from A. Then when A initiates a call to B, B shall decide whether to allow the incoming call from A based on the relative information in the registry. For example, the called terminal B determines whether the calling number is registered in the registry. If the calling number is registered in the registry, the current call shall be connected to the called user, otherwise the called terminal shall refuse the current call.

The invention is hereinafter described in detail with reference to the accompanying drawings and detailed embodiments.

Figure 1:
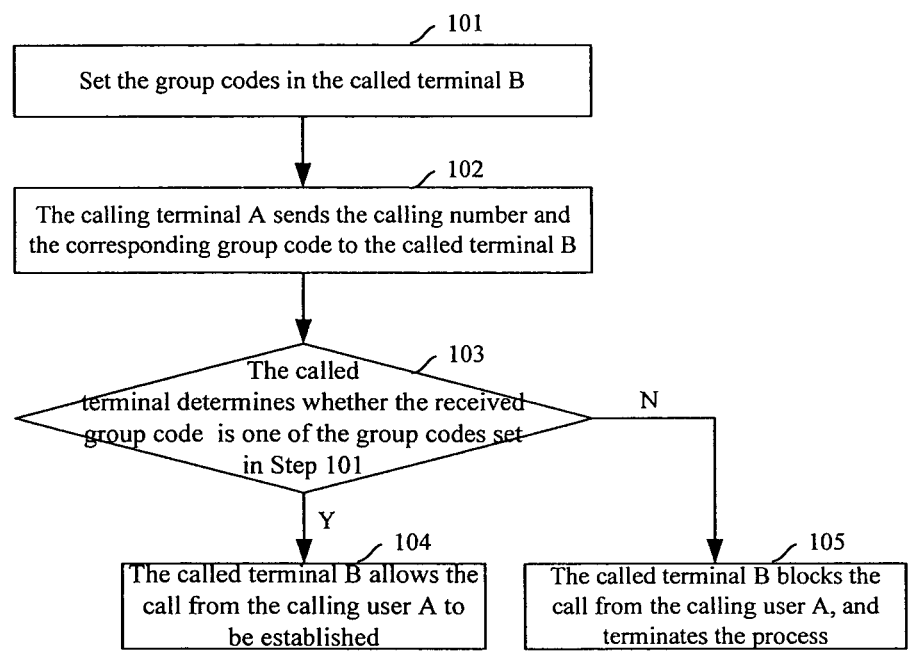
FIG. 1 is a flow chart illustrating the detailed implementation in accordance with the first embodiment of the invention.

FIG. 1 is a flow chart illustrating the detailed implementation in accordance with the first embodiment of the invention. The embodiment comprises the following steps.

Step 101, group codes are set in the called terminal B;

In some Scenarios, e.g., when the called user is in an important meeting or is asleep at midnight, the called user wishes only a few family members and close friends can contact him through the telephone. Therefore the called user may set up some group codes and tell the group codes to the above-mentioned people so that they are the only ones who shall be connected to the called terminal. In fact, the group code here may be only a password to access the called terminal of the called user.

Step 102, the calling terminal A sends the calling number and the corresponding group code to the called terminal B.

The calling terminal A may send the calling number and the corresponding group code to the called terminal B through short messages or user-to-user signaling (UUS), or through multi-media short messages or e-mails.

If the transfer of the calling number and the corresponding group code from the calling terminal A to the called terminal B is realized through short messages or UUS, the short messages or UUS may contain the group code and the calling number. In practice, if the called terminal B supports a calling number recognition function, the calling terminal A may send the calling number to B by means of the calling number recognition and therefore the short messages or UUS only needs to transfer the group code.

From Step 103 to Step 105, the called terminal B determines whether the received group code is one of the group codes set in Step 101; if the received group code is one of the group codes set in Step 101, the called terminal B shall allow the call from the calling terminal A, otherwise the call from A shall be refused and the process shall be terminated.

Figure 2:
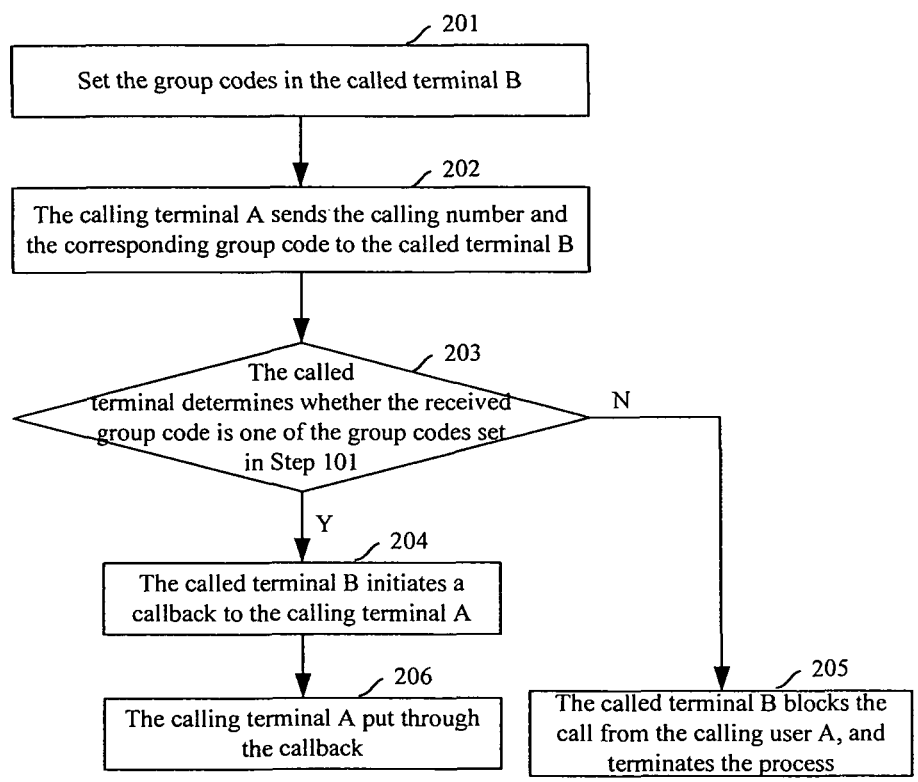
FIG. 2 is a flow chart illustrating the detailed implementation in accordance with the second embodiment of the invention.

In the solution provided by an embodiment of the invention, when allowing the call from the calling terminal A, the called terminal B may further initiate the callback to the calling terminal A and the callback shall be connected to the calling terminal A. Such process is implemented in the second embodiment of the invention and illustrated in FIG. 2.

When the called terminal B refuses the call from the calling terminal A, e.g., the called terminal determines the group code received is not one of the group codes set in Step 201, the called terminal B may also send a message to A, stating that the called terminal B has refused to establish a call between the calling terminal A and the called terminal B, and the message may further contain the reason of the refusal, e.g., the calling terminal A uses a group code which is not set up in advance in the called terminal B, and the calling terminal A may notify the calling user of the message.

In the second embodiment, the called terminal B initiates the callback; the callback may be a short message or a voice call to the calling terminal A, and may be in other forms, e.g., a multi-media short message or UUS. The calling user A may generate different responses according to the different forms of the callback. For instance, if the called terminal B sends a short message as the callback, the called terminal B may also further notify the calling terminal A in the short message of the approval for establishing a call between the calling terminal A and the called terminal B; the calling terminal A may initiate a call after receiving the short message, and the call that the calling terminal A initiates may be a voice call or a multi-media short message call, or in other forms. If the called terminal B initiates a voice call as the callback, the calling terminal A may directly connect the voice call so as to establish the call to the called terminal B. The calling terminal A may also refuse the callback when receiving the callback from the called terminal B, and then automatically initiates a call to the called terminal B. If the callback is in the form of a short message, a multi-media short message or UUS, the calling terminal A may connect the callback and then automatically initiates a call to the called terminal B.

In the second embodiment of the invention, before initiating a callback, the called terminal B may notify the called user and wait for his response. If the called user confirms the callback, the called terminal B initiates the callback to the calling terminal A, otherwise the called terminal B refuses the callback and terminates the process. For example, the called terminal B may notify the called user of the callback request with a voice notification while displaying a notification message on the screen asking "Do you want to call back?"; the called user may press the "Answer" key to confirm the callback, or press the "Clear" key to refuse the callback.

In the second embodiment of the invention, the group code properties could be set for each group code and the called terminal B may respond accordingly based on the property values of the group code. For example, property value 0 indicates calling back the calling terminal A through a voice call; property value 1 indicates calling back through a short message; property value 2 indicates refusing to call back.

A third embodiment of the invention is further suggested based on the first embodiment and the second embodiment. In the third embodiment, a pre-call calling number registry, briefly called a pre-call registry, is set in the called terminal B. When the called terminal B allows a call from the calling terminal A, the calling number shall be stored in the pre-call registry so as to allow establishing a call between the calling terminal A and the called terminal B. Therefore, even if the called terminal B fails to call back, the calling terminal A still can call the called terminal B. When the calling terminal A calls the called terminal B, the called terminal B may determine whether to connect the call according to the pre-call registry.

In the third embodiment, the detailed process, according to which the calling number is stored in the pre-call registry so as to allow a call to be established between the called terminal B and the calling terminal A, comprises: when receiving the call from the calling terminal A, the called terminal B determining whether the corresponding calling number of the current call is stored in the registry of the called terminal B; if the corresponding calling number of the current call is stored in the registry of the called terminal B, the current call shall be connected by the called terminal B to the called user, otherwise the called terminal B shall refuse the current call.

Besides, in accordance with the third embodiment the pre-call register may further be canceled. For instance, the calling terminal A shall send a pre-call register cancellation command to the called terminal B when the calling terminal A needs to cancel the pre-call register. The command may be identified with a negative value of the group code, e.g., sending a group code with the negative value indicates to cancel the pre-call register. Command codes may also be used to distinguish the register command and the register cancellation command. The called terminal B shall cancel the corresponding pre-call register after receiving the register cancellation command. The register cancellation command may comprise the corresponding calling number and the group code. Before cancelling the pre-call register, the called terminal B may determine whether the register cancellation command is valid, i.e. whether the group code is one of the group codes set in the called terminal. If the command is valid, the corresponding register entry shall be searched out of the pre-call registry according to the calling number, and then be deleted.

When the called terminal B calls back the calling terminal A, the calling terminal A may automatically calls back the called terminal B after receiving the approval for establishing a call to the called terminal B; the callback from the calling terminal A may be a voice call or a multi-media short message, or a call in other forms. For instance, based on the second embodiment and the third embodiment, the calling terminal A shall determine whether the information in the callback comprises the approval for establishing the call to the called terminal B; if the information in the callback comprises the approval for establishing the call to the called terminal B, the calling terminal A shall call back the called terminal B, otherwise the calling terminal A shall not initiate the callback.

Generally speaking, in the aforesaid embodiments, the limited application of the other services can be realized through the unlimited short message service, i.e., the short messages can be used to control services such as the voice calls, the multi-media short messages, etc. And in practical applications, the limited application of the short message service can also be realized through the unlimited voice services. Through the above solution, the limited application of other services can be realized, too.

In practical applications, a user usually wishes other users to only call him through a certain group code in scenarios such as in some specific periods of time, or under some certain circumstances. To solve the problem, the user may set matching pairs of group codes and the corresponding scenarios in the called terminal. The scenario may be a calling period of the group code such as a period of time between 00:00 and 06:00, or in case of emergency such as the case when the user is in an urgent meeting.

In view of the above situation, scenarios and the matching relationship between the group codes and the scenarios can further be set in the aforesaid embodiments. Taking the first embodiment as an example, the called terminal B determining whether the received group code is one of the group codes set in Step 101 in the first embodiment comprises: the called terminal determining whether the received group code and the current scenario fulfill the matching relationship of the group codes and the scenarios. For example, the called terminal B may retrieve the corresponding group codes according to the current scenario and the matching relationship, and then determines whether the retrieved group codes include the group code received from the calling terminal A. If the retrieved group codes include the group code received from the calling terminal A, the matching relationship is fulfilled; otherwise the matching relationship is not fulfilled. The called terminal B may also retrieve the corresponding scenarios according to the received group codes and the matching relationship, and then determines whether the retrieved scenarios include the current scenario.

As for the matching relationship between the scenarios and the group codes, if the called user is able to decide that he does not want to be disturbed in one or several periods of time, he may set group code calling periods, and may set one or more corresponding group codes for each group code calling period that has been set. Therefore in a certain period of time, only the users who know the corresponding group codes may be connected to the called user. And if the called user is in a meeting or other emergency, or under special circumstances such as in a concert, and he does not want to be disturbed, he can set emergency cases, and may set one or more corresponding group codes for an emergency case, i.e. the called user may set the matching relationship between the group codes and a certain emergency so that in an emergency only the users who know the corresponding group codes may be connected to the called user. For instance, setting emergency cases comprises: setting one or more emergency levels in the called terminal, e.g., an urgent meeting level, a concert level, etc. Emergency levels can be used to identify different types of emergencies, e.g., one or more emergency levels and one normal level can be set, wherein the normal level does not have a corresponding group code and indicates non-emergency cases.

The scenarios of the calling periods of the group codes may overlap with the scenarios of the emergencies, which means that a calling period of the group code may also be in an emergency. Taking the first embodiment as an example again, when there are overlapped scenarios, Step 103 may further comprises: the called terminal B determining whether the received group code is the group code corresponding to the current group code calling period, or determining whether the received group code is the group code corresponding to the current emergency, or determining whether the received group code belongs to the intersection of the group codes corresponding to the current group code calling period and the group codes corresponding to the current emergency, or determining whether the received group code belongs to the union of the group codes corresponding to the current group code calling period and the group codes corresponding to the current emergency.

In Step 103, the called terminal B may also directly determine whether the received group code is one of the group codes set in Step 101, the determination process comprises: the called terminal B determining whether the received group code is the group code corresponding to the current group code calling period, or determining whether the received group code is the group code corresponding to the current emergency, or determining whether the received group code belongs to the intersection of the group codes corresponding to the current group code calling period and the group codes corresponding to the current emergency, or determining whether the received group code belongs to the union of the group codes corresponding to the current group code calling period and the group codes corresponding to the current emergency.

Obviously, the called terminal B should firstly acquire the current scenario when an incoming call arrives, if the called terminal B is neither in a scenario of any group code calling period, nor in a scenario of any emergency, the called terminal B shall process the incoming call according to a normal work process. In other words, the called terminal B may directly connect a voice call, or receive a multi-media short message. If the calling terminal A sends the calling number and the corresponding group code to the called terminal B, the called terminal B may directly discard the information.

Figure 3:
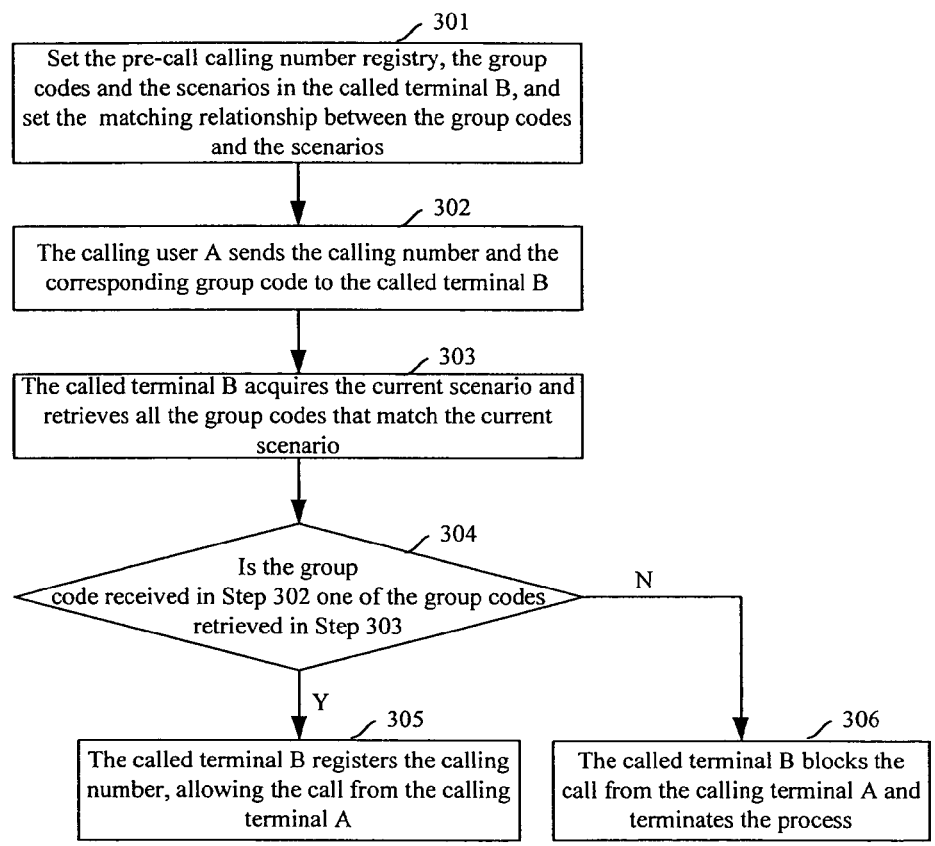
FIG. 3 is a flow chart illustrating the detailed implementation in accordance with the fourth embodiment of the invention.

The description hereinafter focuses on the response of the called terminal B in a scenario of a group code calling period or in a scenario of an emergency when an incoming call arrives. The fourth embodiment of the invention, which is described hereinafter, is a detailed implementation process based on the third embodiment of the invention while further setting scenarios and the matching relationship between the group codes and the scenarios. The process is illustrated in FIG. 3.

Step 301, a pre-call calling number registry, the group codes and the scenarios as well as the matching relationship between the group codes and the scenarios are set in the called terminal B.

Step 302, the calling user A sends the calling number and the corresponding group code to the called terminal B.

Step 303, the called terminal B acquires the current scenario and retrieves all the group codes that match the current scenario according to the matching relationship set in Step 301.

From Step 304 to Step 306,

Step 304: the called terminal B determines whether the received group code is one of the group codes retrieved in Step 303;

if the received group code is one of the group codes retrieved in Step 303, proceeding to Step 305: the called terminal B shall register the calling number, and allow the call from the calling terminal A; otherwise, proceeding to Step 306: the called terminal B shall not register the calling number, refuse the call from the calling terminal A and terminate the process.

The scenarios and the matching relationship between the group codes and the scenarios may also be set based on the second embodiment without registering the calling number in Step 305. Instead, the called terminal B directly calls back the calling terminal A in Step 305; correspondingly, in Step 306, the called terminal B directly refuses the call from the calling terminal A.

In case that the scenarios are set, the called terminal B may further send the reason of the refusal to the calling terminal while refusing the call from the calling terminal A, e.g., the called terminal B may send the reason of the refusal to the calling terminal A through short messages, UUS, etc. The reason of the refusal may be that the received group code is not one of the preset group codes in the called terminal B, or that the received group code does not match the current scenario, etc.

In practical applications, even when the called terminal finishes the determination before registering, the called terminal may receive a group code that matches the scenario at the time of registering but does not match the changed scenario at the time of connecting the incoming call to the called user since the scenario may change. In view of the above situation, the calling number registry in the called terminal may further comprise the group code received at the time of registering the calling number. The relative pre-call registry is shown in the table below:

TABLE 1

| Calling Number | Group Code |
| --- | --- |
| 13823768263 | ****** |
| 01082037788 | ****** |

Figure 4:
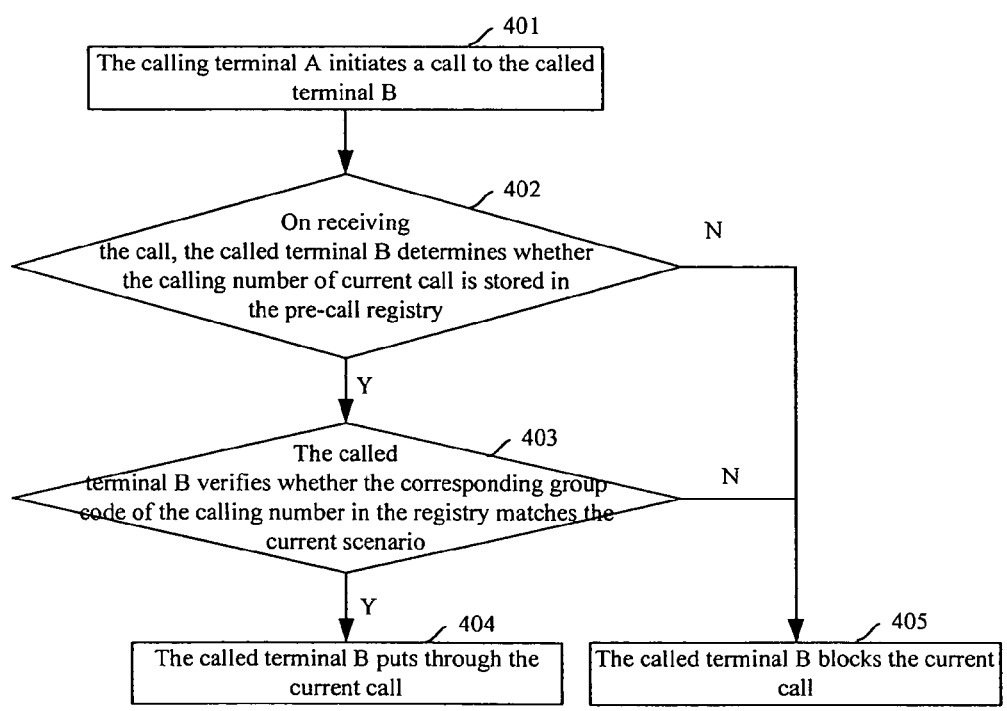
FIG. 4 is a flow chart illustrating the detailed implementation in accordance with the fifth embodiment of the invention.

When the called terminal B registers the calling number in Step 305, the corresponding group code shall also be registered. The registry actually stores the matching relationship of the calling numbers and the corresponding group codes. Therefore the called terminal can retrieve the corresponding group code from the registry according to the calling number when an incoming call arrives, and can determine whether the retrieved group code matches the current scenario. If the retrieved group code matches the current scenario, the current call shall be connected to the called user, otherwise the current call shall be refused. The detailed process that the called terminal B performs when receiving a call in the above situation is shown in the fifth embodiment of the invention. FIG. 4 illustrates the process in accordance with the fifth embodiment.

Step 401, the calling terminal A initiates a call to the called terminal B.

Step 402, when the call arrives, the called terminal B determines whether the calling number of the current call is stored in the registry of the called terminal B; if the calling number of the current call is stored in the registry of the called terminal B, the called terminal B proceeds to Step 403, otherwise proceeds to Step 405.

From Step 403 to Step 404, the called terminal B determines whether the corresponding group code of the calling number in the registry matches the current scenario; if the corresponding group code of the calling number in the registry matches the current scenario, the current call shall be connected to the called user, otherwise the called terminal B proceeds to Step 405.

Step 405, the called terminal B refuses the current call.

The called terminal may also determine the information in the registry when a call needs to be connected. If a group code does not match the current scenario, the group code and its corresponding calling number shall be deleted from the registry. Then the called terminal goes on to determine whether the calling number of the current call is stored in the registry; if the calling number of the current call is stored in the registry, the current call shall be connected to the called user, otherwise the current call shall be refused.

In the fourth embodiment, before registering the calling number in Step 304, the called terminal B may skip the process of determining whether the group code sent by the calling terminal is the group code corresponding to the current scenario, i.e. skip the process of determining whether the received group code matches the current scenario. Instead, the called terminal B just determines whether the received group code is one of the group codes set by the called user before registering the matching relationship between the group code sent by the calling terminal and the corresponding calling number. In such a situation, according to the fifth embodiment, when a call needs to be connected to the called user, the called terminal may also determine whether to connect the current call based on whether the group code corresponding to the calling number of the current call matches the current scenario. Thus the scenario function of whitelist may also be realized. In other words, the entries of the pre-call registry may be stored, but the call from the corresponding calling number in the pre-call registry may only be connected to the called user in certain scenarios.

If the scenario changes and the group code does not match the current scenario any more, the called terminal may determine the information in the registry before connecting a call. If a certain group code does not match the current scenario, the group code and the corresponding calling number shall be deleted from the registry, and then the called terminal B determines whether the calling number of current call is stored in the registry. If the calling number of the current call is in the registry, the current call shall be connected to the called user; otherwise the current call shall be refused. Another solution comprises: the called terminal actively searching the group codes in the registry when the scenario shifts from one to another. If a certain group code does not match the current scenario, the called terminal shall delete the group code and the corresponding calling number. Therefore the called terminal may carry out the determination directly after a call arrives based on whether the corresponding calling number is stored in the registry.

The called terminal may also check the registry regularly and delete group codes which do not match the current scenario and the corresponding calling numbers, thus the data volume in the registry is limited. However, the regular deletion does not accurately guarantee that a group code matches the current scenario, so the called terminal should still carry out the working process described in the fifth embodiment when a call arrives.

The registry, based on the pre-call registry in the third embodiment, can further comprise a designated period for allowing establishing the call with the calling terminal A. The designated period may start at the register time and last for a preset length. The corresponding pre-call registry is shown in the table below:

TABLE 2

| Calling Number | Beginning Time | Ending Time |
|---|---|---|
| 13823768263 | 02:20 | 02:50 |
| 01082037788 | 10:38 | 11:38 |

Therefore, when the calling user has gone through a pre-call register, the called terminal allows him to call in a designated period. In the hours other than the designated period, the calling still needs to go through a pre-call register process when calling the called terminal. The called terminal shall delete the entry of the pre-call register that has expired in terms of the time.

In the case of that scenarios have been set, for example, in the scenario of the group code calling period, the register time could be set as the beginning point of the designated period, and the ending time of the current group code calling period could be set as the ending point of the designated period; in the scenario of an emergency, the register time could be set as the beginning point of the designated period, and the preset duration of a certain emergency could be set as the duration of the designated period, or the preset common duration of all the emergencies could be set as the duration of the designated period. The corresponding pre-call registry is shown in the table below:

TABLE 3

| Calling Number | Beginning Time | Ending Time | Description |
|---|---|---|---|
| 13823768263 | 00:15 | 06:00 | Scenarios of the group code calling period |
| 01082037788 | 10:38 | 11:38 | Scenarios of the emergencies |

According to the above table, in Step 303 and 304 in the fourth embodiment, the called terminal B may firstly determine whether the group code sent by the calling terminal A is the corresponding group code of the current scenario, i.e. determine whether the received group code matches the current scenario. If the group code matches the current scenario, the called terminal B registers the calling number and the designated period of the calling terminal A; otherwise the called terminal B shall not register the calling number, and terminate the process. In steps from 402 to 405 in the fifth embodiment, when an incoming call arrives, the called terminal B may determine whether to connect the current call directly according to whether the calling number is registered and whether the calling time of the current call is during the corresponding designated period of the calling number.

Figure 5:
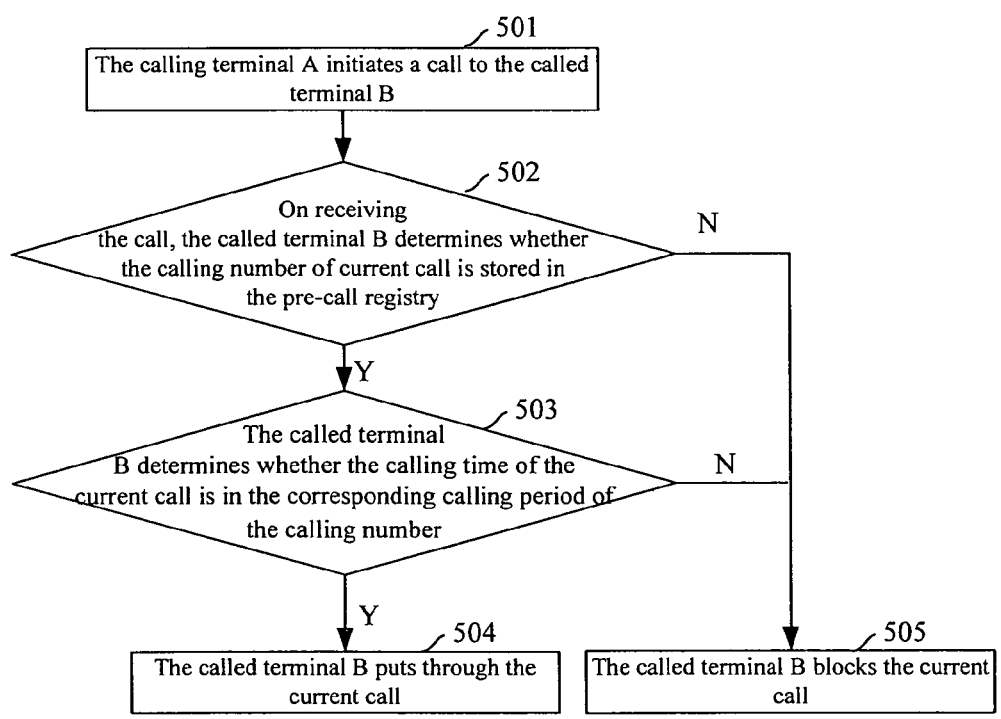
FIG. 5 is a flow chart illustrating the detailed implementation in accordance with the sixth embodiment of the invention.

When the pre-call registry of called terminal B further comprises the designated period of the calling terminal A, the determination process of the called terminal B is illustrated in the sixth embodiment of the invention in FIG. 5. FIG. 5 is a flow chart illustrating the detailed working process of the called terminal B when the called terminal B receives a call.

Step 501, the calling terminal A initiates a call to the called terminal B.

Step 502, when the call arrives, the called terminal B determines whether the calling number of the current call is stored in the registry of the called terminal B; if the calling number of the current call is stored in the registry of the called terminal B, the called terminal B proceeds to Step 503, otherwise proceeds to Step 505.

From Step 503 to Step 504, the called terminal B determines whether the calling time of the current call is during the designated period corresponding to the calling number in the registry; if the calling time of the current call is during the designated period corresponding to the calling number in the registry, the current call shall be connected to the called user, otherwise the called terminal B proceeds to Step 505.

Step 505, the called terminal B refuses the current call.

For example, a user sets in his terminal three group code calling periods and two priority levels. One of the two priority levels is 0, indicating a normal status level, and the other is an integer larger than 0, indicating an emergency level. The corresponding group code of the emergency level is 11112222. The emergency level may also be a random fixed value other than 0. The emergency level in the invention is superior to the group code calling periods. In other words, when the called terminal is at an emergency level, the calling terminal cannot access the called terminal with a group code corresponding to a group code calling period even if the calling time is during the group code calling period. The three group code calling periods are shown in the table below:

TABLE 4

| Beginning Time | Ending Time | Group Code |
|---|---|---|
| 00:00:00 | 07:00:00 | 66688888 |
| 19:00:00 | 23:00:00 | 66688888, 22236789, 33123456 |
| 23:00:00 | 23:59:59 | 66688888, 22236789 |

The group code for the family members is 66688888; the group code for the friends is 22236789; and the group code for the colleagues is 33123456. According to the settings in Table 4, calls with the group code 66688888 may access the called terminal at any time; calls with the group code 22236789 may only access the called terminal from 19:00:00 to 23:59:59; and calls with the group code 33123456 may only access the called terminal from 19:00:00 to 23:00:00.

For instance, a calling user sends a group code to the called terminal before calling the called user, e.g. the sent group code is 11112222; the called terminal shall determine whether it is in the emergency level. If it is in the emergency level, after confirming that the group code is the corresponding group code of the emergency level, the called terminal shall acquire the calling number and directly register the matching relationship of the group code and the calling number. If it is not in the emergency level, the called terminal shall determine whether it is during any of the group code calling periods. If it is during a group code calling period, after confirming that the received group code is not the group code corresponding to the group code calling period, the called terminal shall refuse the pre-call registration of the calling number. If it is not in any scenario, the called terminal shall directly connect the current call to the user when the calling user calls. If it is not in any scenario, when the calling user sends group code to the called terminal, the called terminal may discard the group code without any processing.

The called user may also set a super group code which is valid in any scenario; therefore the called terminal shall connect a call when the calling party initiates the call to the called terminal with the super group code, no matter what scenario the called terminal is in. So the user may tell his family members and friends the super group code, enabling them to contact the called user through the called terminal in any circumstances. It will be very convenient for the calling user and his family members or friends to keep in touch.

In the above embodiments of the invention, a user sets in his terminal some group codes and the corresponding calling periods, and he may also set some group codes and the corresponding emergencies.

In fact, the called terminal may also establish a matching relationship between the group codes and the scenarios through levels. For example, the called terminal may assign a level for each group code, and assign a level for each scenario. Therefore, the calling user may access the called terminal with a group code according to a level in any scenario with the level. Thus it will be more convenient to set the relationship between the group codes and the scenarios.

For example, in the fourth embodiment of the invention, the called user may further set group code levels in the called terminal B in Step 301 so as to control the incoming calls more flexibly. Supposing that the user feels that he does not want to be disturbed between 00:00:00 and 07:00:00, and he may only answer the calls from the family members such as his parents or children, then he can assign the highest group code level, which is level 1, to the period of time. In a period between 07:00:00 and 08:00:00, or between 23:00:00 and 24:00:00, the user also allows calls from the close friends besides the calls from the family members, then he may assign a second highest group code level, which is level 2, to such two periods of time. In this way the user can assign a group code level to each group code calling period. Then the user may set one or more group codes and assign a level to every group code. The relations between the group code calling periods and the group code levels can thus be established in the terminal, as illustrated in Table 5. And the relations between the group codes and the group code levels can also be established in the terminal, as illustrated in Table 6.

TABLE 5

| Beginning of the group code calling period | Ending of the group code calling period | Group Code Level |
|---|---|---|
| 00:00:00 | 07:00:00 | 1 |
| 07:00:00 | 08:00:00 | 2 |
| 12:00:00 | 13:00:00 | 3 |
| 18:00:00 | 20:00:00 | 4 |
| 20:00:00 | 23:00:00 | 3 |
| 23:00:00 | 24:00:00 | 2 |

TABLE 6

| Group Code Level | Group Code | Indication |
|---|---|---|
| 1 | 666668 | Level 1 group code (equals super group code) |
| 2 | 222223 | Level 2 group code |
| 3 | 123456 | Level 3 group code |
| 4 | 345678 | Level 4 group code |

Among the group code levels in Table 5 and Table 6, level 1 is the highest level and therefore the group codes according to level 1 are super group codes. In the practical implementation, it can be set that the group codes with a higher level are also valid for a lower level. For example, during the calling period of level 2 group codes, which is from 23:00:00 to 24:00:00, the level 1 group code 666668 will be valid for the called terminal B, too.

When the group code levels are set up, the called terminal may register or connect the current call according to the level information. When registering the matching relation between the calling number and the group code, the called terminal shall determine whether the group code matches the current scenario according to the group code level. While determining whether the group code used by the current call is the corresponding group code of the current scenario, the called terminal shall acquire the scenario level according to the current scenario, and acquire the group code level of the current group code. If the group code level equals or is higher than the current scenario level, the group code shall be valid in the current scenario.

Several group code calling periods are set in the aforesaid embodiment, and in the practical implementation, the user may flexibly set the group codes and the calling periods based on his own needs.

In accordance with the embodiments of the invention, a maximum number of incorrect group codes could be further set. When the calling terminal sends the group code to the called terminal, if the number of the incorrect group codes sent by the calling terminal exceeds the maximum number of incorrect group codes, the called terminal shall record the calling number in the blacklist. The maximum number of incorrect group codes can be set on demand, such as 10. Based on the above settings, while receiving the group code sent by the terminal, the called terminal may firstly determine whether the calling number is in the blacklist. If the calling number is in the blacklist, the call from the calling terminal shall be refused; otherwise the called terminal shall proceed with the aforesaid steps to verify the group code.

The function of automatic blacklist greatly increases the difficulty of attacking the group codes by means of infinite enumeration, and effectively prevents hostile attacks to the group codes. In the practical implementation of the invention, a friend of the called user may be listed in blacklist just because the friend forgets the group code. In such circumstances, the friend may contact the called user through other means, such as the ordinary short messages. The called user shall remove the number of the friend from the blacklist after confirming the identity of the friend, and then tell the friend the correct group code. If the called terminal supports the short message services, the calling user, i.e. the friend, may contact the called user through the short messages and the called user determines whether the calling user is valid based on the short messages. If the calling user is valid, the called user can delete the calling number from the blacklist manually and tell the calling user the corresponding group code. So the invention will bring much convenience to users without any trouble. After allowing the call from the calling terminal, the called terminal may further determine whether the calling number and the corresponding number of incorrect calls are recorded in the called terminal; if the calling number and the corresponding number of incorrect calls are recorded in the called terminal, the record shall be deleted.

In accordance with the embodiment of the invention, the calling number can be a terminal number or a personal number, based on different call types of the call initiated by the calling user.

In the implementation of the group code calls, the friends of the called user will not lose contact with the called user just because the call user has changed his group codes. As long as the called user does not change his contact number, the calling users may contact the called user through the contact number in other periods of time; and if the called terminal supports the short message services, the calling users may contact the called user at any time through the short messages. This is totally different from the situation in which the old friends lose contact with the called user because the called user changes his telephone number. So the function of group code call can effectively satisfy the actual needs of the users.

The calls mentioned in the above embodiments refer to telephone calls, but obviously the calls can also be the multi-media short messages and etc., or other new telecommunication services which may appear in the future. Therefore, the services such as the multi-media short message service can also be processed in similar ways to enable the called user to refuse some specific multi-media short message in a certain period of time. And the calls may also be the text short messages, and in such circumstances the calling numbers and the group codes can be sent to the called terminal through UUS. Correspondingly, the calls may be UUS, too, and in such circumstances the calling numbers and the group codes can be sent to the called terminal through the text short messages or the multi-media short messages.

The invention can solve the problem of harassing telephone calls and harassing multi-media short messages, and the calling numbers and the group codes may be sent to the called terminal through the common text short messages.

Besides, the short messages or UUS sent by the calling terminal to transfer the group codes may be identified with special marks, e.g., *#XXXXXX#*YYYYYY can be used to identify a specific group code, XXXXXX is the identification code and YYYYYY is the group code. For example, 000100 is the identification code of a short message or UUS which transfers the group code, when the group code is 135789, the content of the short message or UUS is *#000100#*135789. In the practical implementation, for the convenience of the user, a group code short message menu can be added into the called terminal. When the user creates a short message through the menu, the called terminal automatically adds the identification code XXXXXX into the short message.

If the short message carries the calling number directly, *#XXXXXX#*YYYYYY*NNNNNNNNNNNN can be used, wherein NNNNNNNNNNNN is the calling number, and 000110 shall be used to identify a group code short message or UUS carrying the calling number.

*#XXXXXX#*YYYYYY* can be used to identify the corresponding register cancellation command, and 001100 can be used to identify a group code short message or UUS for register cancellation.

The called terminal can determine whether a short message carries the group code according to the existence of *#??????#* in the short message. Among the above string, ? stands for any character.

The foregoing is only the preferred embodiments of the invention and is not to be used in limiting the protection scope thereof.

What is claimed is:

1. A method for controlling the process of establishing a call, the method comprising:
setting group codes in a called terminal, wherein setting the group codes comprises setting in the called terminal a maximum number of sending incorrect group codes, and setting a blacklist to record all the calling numbers which have sent the incorrect group codes more than the maximum number of times;

receiving, by the called terminal, a calling number and a corresponding group code transmitted by a calling terminal corresponding to the calling number;

determining whether the corresponding calling number of the group code is in the blacklist stored in the called terminal;

if the corresponding calling number of the group code is in the blacklist stored in the called terminal, refusing, by the called terminal, the call from the calling number and terminating the process;

if the corresponding calling number of the group code is not in the blacklist stored in the called terminal, determining, by the called terminal, whether the received group code is one of the group codes set in the called terminal;

if the received group code is one of the group codes set in the called terminal, allowing a call to be established between the calling terminal and the called terminal, otherwise, refusing the call;

before the refusing the call, determining, by the called terminal, whether the calling number and the corresponding number of sending incorrect group codes have been recorded in the called terminal; if the calling number and the corresponding number of sending incorrect group codes have not been recorded in the called terminal, recording, by the called terminal, the calling number and set the number of incorrect group codes, otherwise incrementing, by the called terminal, the previously recorded number of incorrect group codes and determining whether the number of incorrect group codes after adding exceeds the preset maximum number of incorrect group codes; if the number of incorrect group codes after adding exceeds the preset maximum number of incorrect group codes, adding, by the called terminal, the calling number to the blacklist, otherwise not adding, by the called terminal, the calling number to the blacklist;

wherein the method further comprises, in the called terminal, setting a level for every group code and a level for every scenario; and wherein determining, by the called terminal, whether the received group code is one of the group codes set in the called terminal comprises determining, by the called terminal, whether the level of the received group code is higher than the level of the current scenario.

2. The method according to claim 1, wherein allowing the call to be established between the calling terminal corresponding to the calling number and the called terminal comprises:
returning, by the called terminal, a callback indicating that the call is allowed.

3. The method according to claim 2, wherein the callback returned by the called terminal is the callback to the calling number corresponding to the group code; and
the method further comprises:
automatically initiating, by the calling terminal, a call to the called terminal after receiving the callback from the called terminal.

4. The method according to claim 2, wherein the callback returned by the called terminal is one of:
a short message, a voice call, or a User-to-User Signaling.

5. The method according to claim 2, before the called terminal returns the callback, further comprising:
requiring its user to confirm whether to send the callback; if the answer is positive, returning, by the called terminal, the callback; otherwise, cancelling, by the called terminal, the callback.

6. The method according to claim 2, wherein the step of setting group codes in the called terminal further comprises:
setting group code properties indicating whether the callback is to be sent for the group codes stored in the called terminal; and
the method, before sending the callback, further comprises:
acquiring, by the called terminal, the group code property corresponding to the group code, and deciding whether to send the callback according to the acquired group code property.

7. The method according to claim 1, wherein the refusing the call comprises:
returning, by the called terminal, a callback indicating that the call is refused.

8. The method according to claim 7, wherein the callback returned by the called terminal further comprises:
the reason for refusing the call.

9. The method according to claim 7, before the called terminal returns the callback, further comprising:
requiring, by the called terminal, its user to confirm whether to send the callback; if the answer is positive, returning, by the called terminal, the callback; otherwise cancelling, by the called terminal, the callback.

10. The method according to claim 7, wherein the callback returned by the called terminal is one of:
a short message, a voice call, or a User-to-User Signaling.

11. The method according to claim 7, wherein the step of setting group codes in the called terminal further comprises:
setting group code properties indicating whether the callback is to be sent for the group codes stored in the called terminal; and
the method, before sending the callback, further comprises:
acquiring, by the called terminal, the group code property corresponding to the group code, and deciding whether to send the callback according to the acquired group code property.

12. The method according to claim 1, wherein the step of setting group codes in the called terminal further comprises:
setting a pre-call calling number registry in the called terminal; and
allowing, by the called terminal, a call to be established between the calling terminal and the called terminal further comprises:
registering, by the called terminal, the calling number in the pre-call calling number registry.

13. The method according to claim 12, after registering, by the called terminal, the calling number in the pre-call calling number registry, further comprising:
on receiving the incoming call, determining, by the called terminal, whether the calling number of the incoming call is in the pre-call calling number registry; if the calling number of the incoming call is in the pre-call calling number registry, connecting, by the called terminal, the incoming call to its user; otherwise the refusing, by the called terminal, the incoming call.

14. The method according to claim 12, after the step of allowing a call to be established between the calling terminal corresponding to the calling number and the called terminal, or after the step of refusing the call, further comprising:
sending a pre-call register cancellation command which at least comprises information of the calling number to the called terminal; and
deleting, by the called terminal, the calling number from the pre-call calling number registry after receiving the pre-call register cancellation command.

15. The method according to claim 14, wherein the pre-call register cancellation command further comprises the group code, and before the deleting the calling number from the pre-call calling number registry, the method further comprises:
  determining, by the called terminal, whether the group code is one of the group codes set in the called terminal, if the group code is one of the group codes set in the called terminal, deleting the calling number, otherwise, refusing to delete of the calling number.

16. The method according to claim 1, wherein the step of setting group codes in the called terminal further comprises:
  in the called terminal setting scenarios in which the group codes are needed to establish the call, and setting the matching relation between the scenarios and the group codes;
  determining, by the called terminal, whether the received group code is one of the group codes set in the called terminal comprises:
  determining, by the called terminal, whether the received group code matches the current scenario based on the matching relation set in the called terminal.

17. The method according to claim 16, wherein the step of setting group codes in the called terminal further comprises:
  setting a pre-call calling number registry in the called terminal; and
  when the called terminal allows a call to be established between the calling terminal and the called terminal, the method further comprises:
  registering, by the called terminal, the calling number and the corresponding group code in the pre-call calling number registry.

18. The method according to claim 17, further comprising:
  retrieving, by the called terminal, the corresponding group code of the calling number in the pre-call calling number registry on receiving the call; and
  determining, by the called terminal, whether the retrieved group code matches the current scenario, if the retrieved group code matches the current scenario, the called terminal connecting the current call, otherwise the called terminal refusing the current call.

19. The method according to claim 17, further comprising:
  determining whether there is group code that does not match the current scenario in the pre-call calling number registry, if there is group code that does not match the current scenario in the pre-call calling number registry, the called terminal deleting the related information of the group code from the pre-call calling number registry.

20. The method according to claim 19, wherein the called terminal performs the determination according to the pre-call calling number registry on receiving the call;
  the method further comprises:
  on receiving the call, determining, by the called terminal, whether the calling number is stored in the pre-call calling number registry; if the calling number is stored in the pre-call calling number registry, directly connecting, by the called terminal, the current call, otherwise refusing, by the called terminal, the call.

21. The method according to claim 19, further comprising:
  on receiving the call, determining, by the called terminal, whether the calling number is stored in the pre-call calling number registry; if the calling number is stored in the pre-call calling number registry, connecting, by the called terminal, the current call, otherwise refusing, by the called terminal, the call.

22. The method according to claim 21, wherein before connecting the current call, further comprising:
  acquiring, by the called terminal, the corresponding group code of the calling number and determining whether the group code matches the current scenario; if the group code matches the current scenario, connecting, by the called terminal, the current call, otherwise refusing, by the called terminal, the call.

23. The method according to claim 16, wherein the step of setting group codes in the called terminal further comprises:
  setting a pre-call calling number registry in the called terminal;
  when the called terminal allows a call to be established between the calling terminal corresponding to the calling number and the called terminal, the method further comprises:
  registering, by the called terminal, the calling number and the valid period during which a call from the calling terminal are allowed to be established.

24. The method according to claim 23, further comprising:
  on receiving the call, acquiring, by the called terminal, the corresponding valid period corresponding to the calling number of the call in the pre-call calling number registry; and
  determining, by the called terminal, whether it is in the acquired valid period, if it is in the acquired valid period, the called terminal connecting the call, otherwise, the called terminal refusing the current call.

25. The method according to claim 23, further comprising:
  determining, by the called terminal, whether it is in the valid period according to the calling number registered in the pre-call calling number registry; and
  if it is not in the valid period according to the calling number registered in the pre-call calling number registry, deleting, by the called terminal, the related information of the calling number.

26. The method according to claim 25, wherein the called terminal performs the determination according to the pre-call calling number registry on receiving the call;
  the method further comprises:
  on receiving the call, determining, by the called terminal, whether the calling number is stored in the pre-call calling number registry; if the calling number is stored in the pre-call calling number registry, directly connecting, by the called terminal, the current call, otherwise refusing, by the called terminal, the call.

27. The method according to claim 25, further comprising:
  on receiving the call, determining, by the called terminal, whether the calling number is stored in the pre-call calling number registry; if the calling number is stored in the pre-call calling number registry, connecting, by the called terminal, the current call, otherwise refusing, by the called terminal, the call.

28. The method according to claim 27, wherein before connecting the current call, further comprising:
  acquiring, by the called terminal, the corresponding group code of the calling number and determining whether the group code matches the current scenario; if the group code matches the current scenario, connecting, by the called terminal, the current call, otherwise refusing, by the called terminal, the call.

29. The method according to claim 16, wherein the scenario is a group code calling period and/or an emergency.

30. The method according to claim 29, wherein a group code calling period and an emergency are both set in the called terminal;
  determining, by the called terminal, whether the received group code is one of the group codes set in the called terminal comprises:

determining, by the called terminal, whether the received group code matches both the group code calling period and the emergency simultaneously; if the received group code does not match either the group code calling period or the emergency, determining, by the called terminal, whether the group code matches the current scenario; if the received group code matches the group code calling period and the emergency, determining, by the called terminal, whether the group code matches the current group code calling period, or determining whether the group code matches the current emergency, or determining whether the group code is one of all the group codes corresponding to any of the current group code calling period or the current emergency, or determining whether the group code matches both the current group code calling period and the current emergency.

31. The method according to claim 16, further comprising:
in the called terminal setting a super group code which corresponds to all the scenarios.

* * * * *